United States Patent
Okajima et al.

(10) Patent No.: US 7,120,096 B2
(45) Date of Patent: Oct. 10, 2006

(54) DISK APPARATUS

(75) Inventors: Tadashi Okajima, Osaka (JP);
Shigekazu Minechika, Osaka (JP);
Takanobu Hisamitsu, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 212 days.

(21) Appl. No.: 10/497,165

(22) PCT Filed: Dec. 5, 2002

(86) PCT No.: PCT/JP02/12802

§ 371 (c)(1),
(2), (4) Date: Jun. 8, 2004

(87) PCT Pub. No.: WO03/050806

PCT Pub. Date: Jun. 19, 2003

(65) Prior Publication Data

US 2005/0018570 A1    Jan. 27, 2005

(30) Foreign Application Priority Data

Dec. 10, 2001    (JP) .............................. 2001-375221

(51) Int. Cl.
*G11B 7/00*    (2006.01)

(52) U.S. Cl. .............................. 369/47.41; 369/47.38; 369/53.45

(58) Field of Classification Search ............. 369/47.23, 369/44.26, 47.27, 47.43, 53.39, 53.38, 53.45
See application file for complete search history.

(56) References Cited

U.S. PATENT DOCUMENTS 6,292,452 B1 *    9/2001    Endo et al. .................. 720/638

FOREIGN PATENT DOCUMENTS

| JP | 61-170959 | 8/1986 |
|----|-----------|--------|
| JP | 7-235126  | 9/1995 |
| JP | 11-306641 | 11/1999 |
| JP | 11-306661 | 11/1999 |
| JP | 11-306662 | 11/1999 |

* cited by examiner

*Primary Examiner*—Nabil Hindi
(74) *Attorney, Agent, or Firm*—Armstrong, Kratz, Quintos, Hanson & Brooks, LLP

(57) ABSTRACT

In a case of recording data into an optical disk (100), a disk apparatus (10) rotates the optical disk (100) by a ZCLV system, and in a case of reading out the data from the optical disk, the disk apparatus rotates the optical disk by a ZCAV system. By rotating the optical disk by the ZCLV system, a DSP (28) performs a read of a modified read carried out before recording, and a read of a verification carried out after the recording, and thereby, no occurrence of a change of a rotating speed of the optical disk among the modified read, the recording, and the verification.

7 Claims, 6 Drawing Sheets

(A) ZCLV (B) ZCAV

DISK APPARATUS

TECHNICAL FIELD

The present invention relates to a disk apparatus. More specifically, the present invention relates to a disk apparatus that performs an information reproduction from a disk recording medium when a read command is issued, and performs an information recording to the disk recording apparatus when a write command is issued.

PRIOR ART

In a conventional disk apparatus of this kind, there is a disk apparatus in which a disk is rotated by a zone constant linear velocity (ZCLV) system having rotating speeds different by each zone in such a manner that a linear speed is rendered constant at a time of recording, and a disk is rotated by a zone constant angular velocity (ZCAV) system having an approximately constant rotating speed at a time of reproducing. One example of the disk apparatus of such the kind is disclosed in Japanese Patent Laying-open No. 11-66726 [G11B 19/28 7/00 19/247 20/10] laid-open on Mar. 9, 1999. According to this prior art, the ZCLV system is adopted at a time of recording, the ZCAV system is adopted at a time of reproducing, and the rotating speed at a time of reproducing is rendered equal to or less than a maximum rotating speed at a time of recording, and thus, it is made possible to improve a capacity (reproducing speed) at a time of reproducing without damaging a capability (recording speed) at a time of recording.

However, in the disk apparatus of this kind, generally, in a case of performing a process of recording into the disk, the reproducing (modified read) is once performed before the recording, and then, the recording is performed. Furthermore, the reproducing called a verifying is performed for confirming a state of the recording after the recording. Therefore, in the conventional disk apparatus, when recording, in a case of a series of the above-described processes, that is, modified read→recording→verifying, the rotating system of the disk, that is, the rotating speed, is to be changed in the order of the ZCAV system (modified read) →the ZCLV system (recording)→the ZCAV system (verifying). This change of the rotating speed takes time so that there is a problem that a time period required for processing the recording takes long.

SUMMARY OF THE INVENTION

Therefore, it is a primary object of the present invention to provide a novel disk apparatus.

It is another object of the present invention to provide a disk apparatus capable of improving both a recording characteristic and a reproducing characteristic even when a read process is included in a series of processes for recording.

The present invention is a disk apparatus that performs an information reproduction from a disk recording medium when a read command is issued, and performs an information recording to said disk recording medium when a write command is issued, and comprises a setter for setting a rotating system of the disk recording medium to a zone constant linear velocity system when a command to be occurred is the write command, a counter for counting the number of continued occurrences of the read command, and a switcher for switching the rotating system of the disk recording medium between the zone constant linear velocity system and a zone constant angular velocity system corresponding to a count value of the counter when the command to be occurred is the read command.

In the present invention, the rotating system of the disk recording medium at a time of a subsequent read command is switched between the zone constant linear velocity system and the zone constant angular velocity system corresponding to the number of occurring times of the read commands. That is, the setter sets the rotating speed of the disk recording medium to the zone constant linear velocity system when the command to be issued is the write command. In addition, the counter counts the number of times of continued occurrences of the read command. Furthermore, the switcher switches the rotating system of the disk recording medium between the zone constant linear velocity system and the zone constant angular velocity system corresponding to a count value of the counter when the command to be occurred is the read command.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3(A) shows an illustrative view showing a rotating speed of a ZCLV system, and FIG. 3(B) shows an illustrative view showing the rotating speed of a ZCAV system.

BEST MODE FOR PRACTICING THE INVENTION

Figure 1:
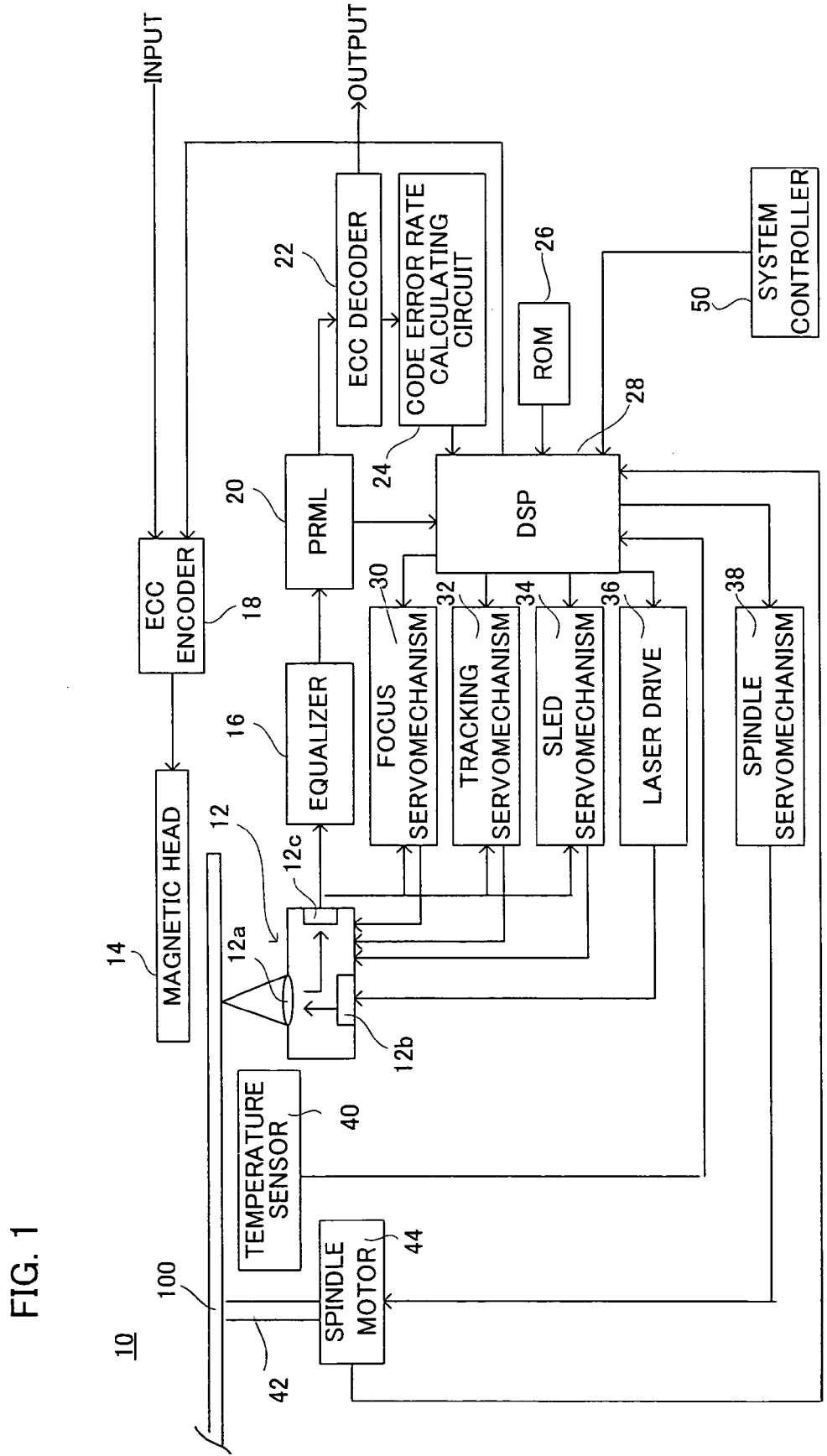
FIG. 1 is an illustrative view showing whole structure of one embodiment of the present invention.

Referring to FIG. 1, a disk apparatus 10 of this embodiment includes an optical pick-up 12. A location of the optical pick-up 12 in a radius direction of the magnetooptical disk 10 is controlled by a sled servomechanism 34. In addition, a location of an optical lens 12a provided in the optical pick-up 12 in an optical axis direction is controlled by a focus servomechanism 30. Furthermore, a location of the optical lens 12a in a radius direction of the magnetooptical disk 100 is controlled by a tracking servomechanism 32.

In a laser drive 36, a laser power value is set by a control signal applied from a DSP 28, and the laser drive 36 allows a laser beam of the set laser power value to be output from a laser diode 12b. The laser beam output from the laser diode 12b is converged by the optical lens 12a, and irradiated onto a recording surface of the magnetooptical disk 100.

The magnetooptical disk 100 includes a reproducing layer and a recording layer, and a desired signal is recorded in the recording layer. When the desired signal is recorded in the recording layer, the laser beam is irradiated onto the recording layer via the optical lens 12a focused on the recording layer and the reproducing layer. When a magnetic field is applied by a magnetic head 14 to the recording layer having a Curie temperature reached by the laser beam, a portion having the Curie temperature reached in the recording layer is magnetized toward a magnetic field direction. Each magnetized portion is referred to as a mark. By controlling the magnetic field produced by the magnetic head 14, the desired signal is recorded in the recording layer of the magnetooptical disk 100.

On the other hand, when the signal is read out from the magnetooptical disk 100, the laser beam is irradiated onto the reproducing layer via the optical lens 12a focused on the reproducing layer. The reproducing layer that has reached a predetermined temperature (temperature lower than the Curie temperature) by a radiation of the laser beam indicates a magnetism, and is magnetized corresponding to the magnetic field retained by the mark in the recording layer. The laser beam reflected in the reproducing layer is deflected corresponding to a direction of the magnetic field of the reproducing layer, and the optical pick-up 12 reads the signal based on a deflecting state of the reflected laser beam.

The recording layer is raised to the Curie temperature so that a recording laser beam needs an output (power) greater than a reproducing laser beam. In addition, the temperature at which the reproducing layer indicates the magnetism is determined in advance. However, an intensity of the laser beam necessary for reaching the temperature differs depending on the temperature of the magnetooptical disk 100. Therefore, besides an optimum recording laser power value, the optimum reproducing laser power value, too, depends on the temperature of the magnetooptical disk 100. It is noted that an ambient temperature of the magnetooptical disk 100 is measured by a temperature sensor 44, and its measurement result is applied to the DSP 28.

When the desired signal is recorded in the magnetooptical disk 100, an ECC encoder 18 attaches an error correcting code (ECC) to an input signal, and encodes the signal to which the error correcting code is attached. The magnetic head 14 produces the magnetic field corresponding to the encode signal applied from the ECC encoder 18.

Herein, the error correcting code is a code attached to each signal of a predetermined amount, and the signal of the predetermined amount to which the error correcting signal is attached is referred to as an ECC block. The ECC block is constructed of a group of signals that is referred to as a plurality of lines. An ECC decoder 22 described later is capable of automatically correcting an erroneous signal (hereinafter briefly referred to as an "error signal") based on the error correcting code when an error is included in a digital signal within the block. However, a signal amount of a correctable error signal has a predetermined limit.

When the signal recorded in the magnetooptical disk 100 is reproduced, the laser diode 12b is controlled by the laser drive 36, and the laser diode 12b outputs the laser beam corresponding to the control. The output laser beam is irradiated onto a surface of the magnetooptical disk 100 via the optical lens 12a. A reflected light from the surface of the magnetooptical disk 100 permeates through the same optical lens 12a, and is incident onto a light detector 12. The light detector 12c applies a signal (RF signal) corresponding to the incident light to an equalizer 16. The equalizer 16 compensates a frequency characteristic of the RF signal, and applies the same to an RPML (Partial Response Maximum Likelihood) circuit 20. The RPML circuit 20 generates the digital signal based on the RF signal, and applies the generated digital signal to the ECC decoder 22. The ECC decoder 22 applies an error correction to the error signal included in the digital signal received from the PRML circuit 20 by each one ECC block. In addition, the ECC decoder 22 applies to a code error rate calculating circuit 24 information (hereinafter briefly referred to as "correcting amount information") indicating how many error signals are corrected in one line of the ECC block, that is, how many error signals are included in one line. The code error rate calculating circuit 24 calculates a code error rate based on the correction amount information applied from the ECC decoder 22, and applies the same to the DSP 28.

The magnetooptical disk 100 is mounted on a spindle (not shown), and the spindle is coupled to a spindle motor 40 via a shaft 42. The DSP 28 applies the control signal to a spindle servomechanism 38, and the spindle servomechanism 38 rotates the spindle motor 40 based on a received control signal. In conjunction therewith, the shaft 42 is rotated, and the spindle, that is, the magnetooptical disk 100, is rotated. In addition, the spindle motor 40 produces an FG signal correlated with a rotating speed of the spindle, and applies this FG signal to the DSP 28. As a result of the DSP 28 monitoring this FG signal, the spindle coupled to the shaft 42, that is, the rotating speed of the magnetooptical disk 100 is appropriately controlled. This control allows the magnetooptical disk 100 to be rotated by the ZCLV system or by the ZCAV system.

Figure 2:
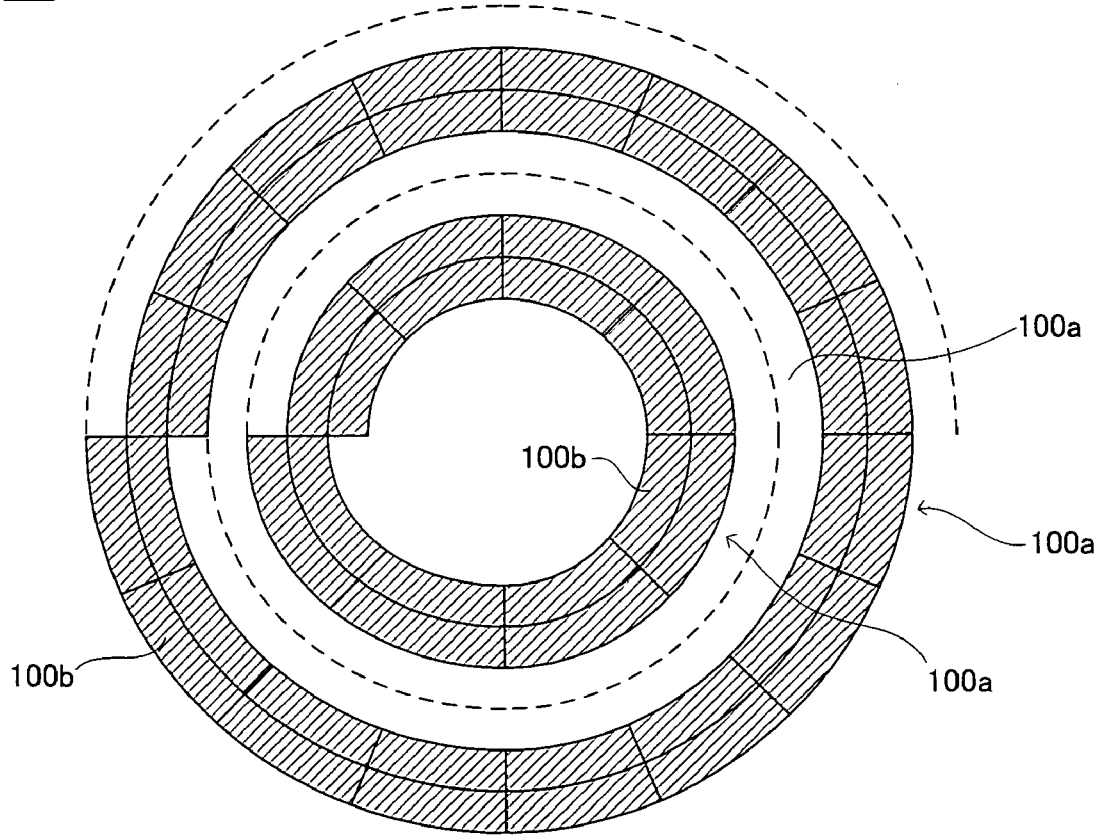
FIG. 2 is an illustrative view showing an overview of a magnetooptical disk.

The magnetooptical disk 100 used in the disk apparatus of this embodiment is, as shown in FIG. 2, is divided into a plurality of areas called a zone 100a that sections the recording surface in a radius direction. This zone 100a is divided into a plurality of areas called a sector 100b. If the zone 100a is the same, the number of the sectors 100b included in one track is the same. However, if the zone is different, the number of the sectors 100b included in one track increases in proportion to a distance from an inner circumference side to an outer circumference side.

Figure 3:
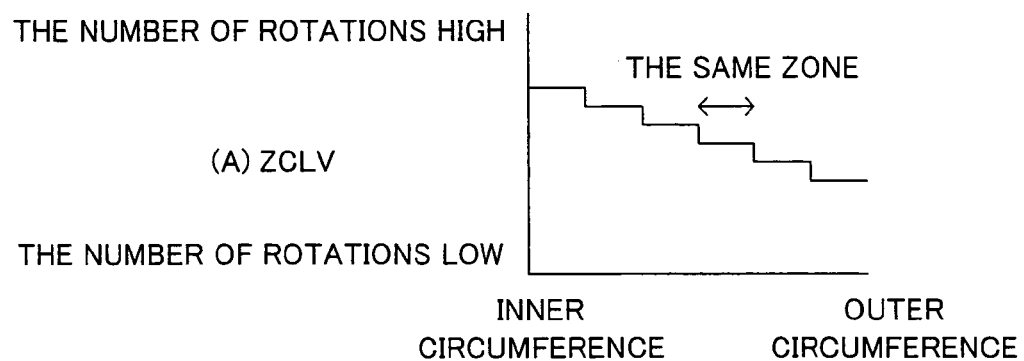
FIG. 3 is an illustrative view showing a difference of a rotating speed of the magnetooptical disk in a model.
Figure 3:
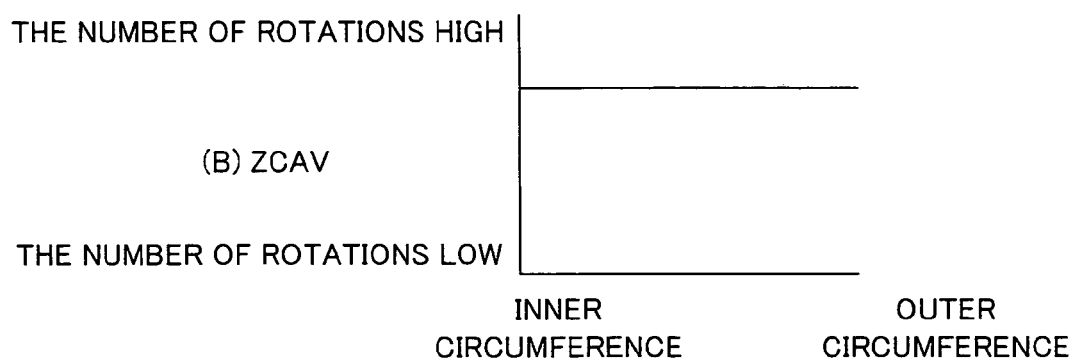

Thus, by a ZCLV system in which a linear speed is constant, as shown in FIG. 3 (A), the rotating speed of the magnetooptical disk 100 is the same in the same zone. However, the closer to the zone 100a on the outer circumference, the slower the rotating speed. It is noted that FIG. 3(A) is a diagram showing a difference of the rotating speed by each zone in a model manner. On the other hand, by a ZCAV system, as shown in FIG. 3(B), the rotating speed of the magnetooptical disk 100 is approximately always constant irrespective of a location of the zone 100a.

Therefore, if the magnetooptical disk 100 is rotated by the ZCLV system at a time of recording, and always rotated by the ZCAV system at a time of reproducing as in the conventional disk apparatus, as understood from FIGS. 3(A), and (B), particularly when the recording (ZCLV system) and the reproducing (ZCAV system) are switched on the outer circumference side of the magnetooptical disk 100, a changing amount of the rotating speed becomes great, thus it takes a long time. Therefore, it takes a time to switch between the recording and the reproducing.

As described above, at a time of recording, the reproducing called the modified read is performed before recording, and the reproducing called the verifying is performed also after recording. Therefore, a switch between the recording and the reproducing, that is, a change of the rotating speed, is always performed at a time of recording so that it takes a long time to record.

As a consequence, in the disk apparatus 10 of this embodiment, regarding the modified read or the verifying, the reproducing is performed by the ZCLV system. In other words, the magnetooptical disk 100 is rotated by the ZCAV system so as to reproduce for speeding up a reproducing process only in a case of a normal reproducing performed continuously. However, the modified read after the normal reproducing is not distinguished from another reproducing, thus, performed by the ZCAV system.

Below, using flowcharts in FIG. 4–FIG. 6, an operation of this disk apparatus 10 will be described. It is noted that the flowchart in FIG. 4 indicates a process performed by a CPU 50 (system controller 50: see FIG. 1) of a host (not shown) of the disk apparatus 10. Herein, the host corresponds to a CPU of a computer in a case that the disk apparatus 10 is a disk drive mounted on the computer, and corresponds to a CPU of a digital camera main body in a case that the disk apparatus 10 is the disk drive mounted on the digital camera.

When an operation of recording is performed toward the host, the CPU 50 of the host determines that the operation of recording is performed in a step S1, and firstly, issues a read command (modified read) to the DSP 28 of the disk apparatus 10 in a step S3. Then, the DSP 28 of the disk apparatus 10 determines that the read command is issued in a step S41 in FIG. 5, and determines whether or not a read counter is "0" in a step S43. The read counter is a counter for counting the read to be executed continuously, and cleared to "0" at a time of starting the disk apparatus 10. When it is determined that the read counter is "0", that is, it is determined that it is the first read after a process (writing and verifying) other than the read, the read counter is incremented by only one to "1" in a step S45. Furthermore, in a step S47, the magnetooptical disk 100 is rotated by the ZCLV system, and a read process is executed in a step S48. In the read process by the ZCLV system, firstly, an intended address is accessed so as to set each parameter value such as a cut-off frequency of an RF low-pass filter, an MO signal header phase adjusting timing, and etc. Next, a read power value of the laser beam is set. In addition, the read is executed. It is noted that the laser power value in the ZCLV system is corrected corresponding to a temperature of the magnetooptical disk 100, and is always rendered an optimum value. Furthermore, a phase adjustment of data and a PLL (Phase Locked Loop) clock is performed during the read.

In a step S49, it is determined whether or not the read is failed in the step S48, and in a case of determining that the read is failed, a failure signal that indicates that the read is failed is issued to the host in a step S51.

Figure 4:
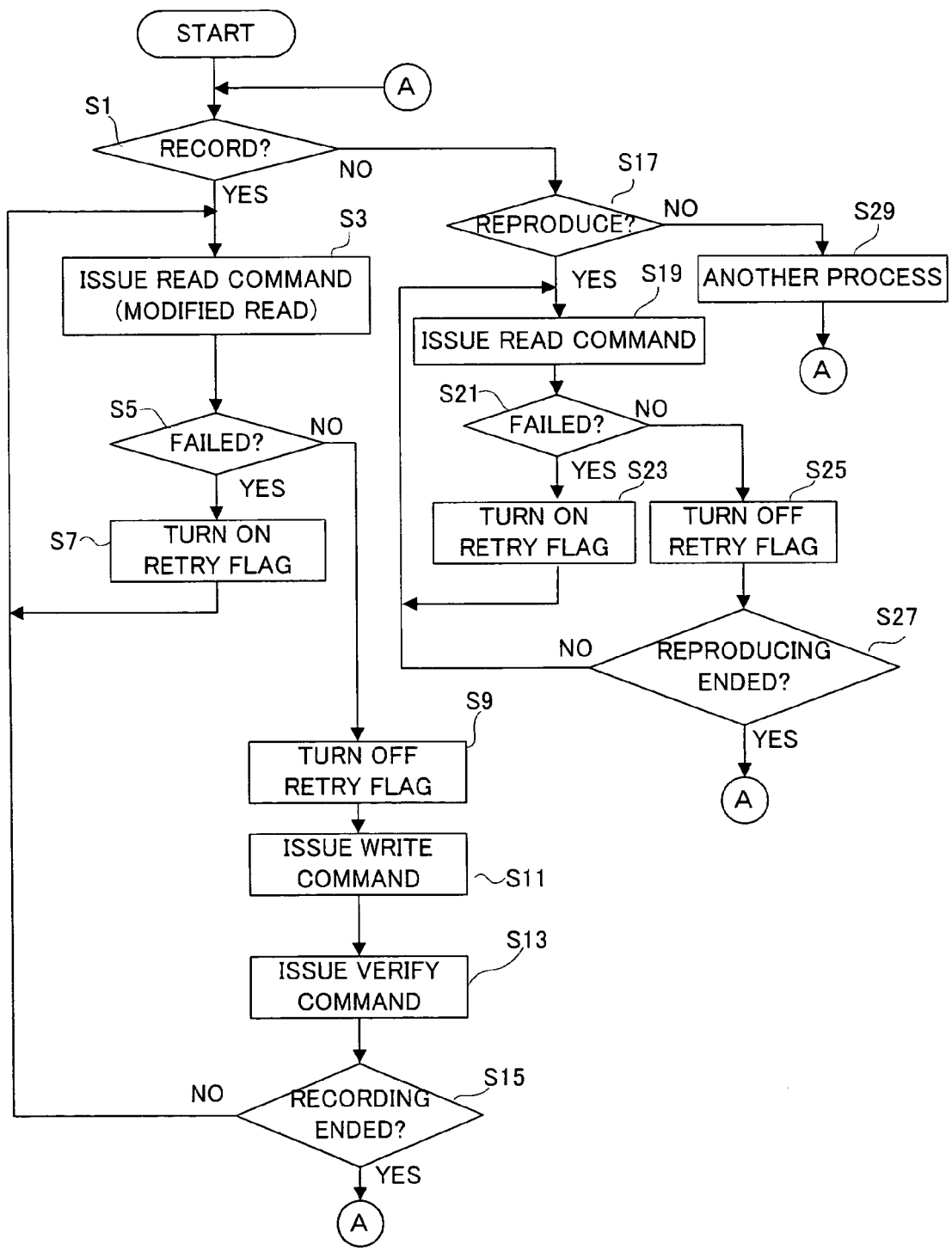
FIG. 4 is a flowchart showing one example of an operation in a FIG. 1 embodiment.

Upon receipt of the failure signal from the disk apparatus 10, the host determines that the read is failed in a step S5 in FIG. 4, and renders a retry flag an on-state in a step S7. Furthermore, the host returns to the step S3 so as to issue the read command once again.

Figure 5:
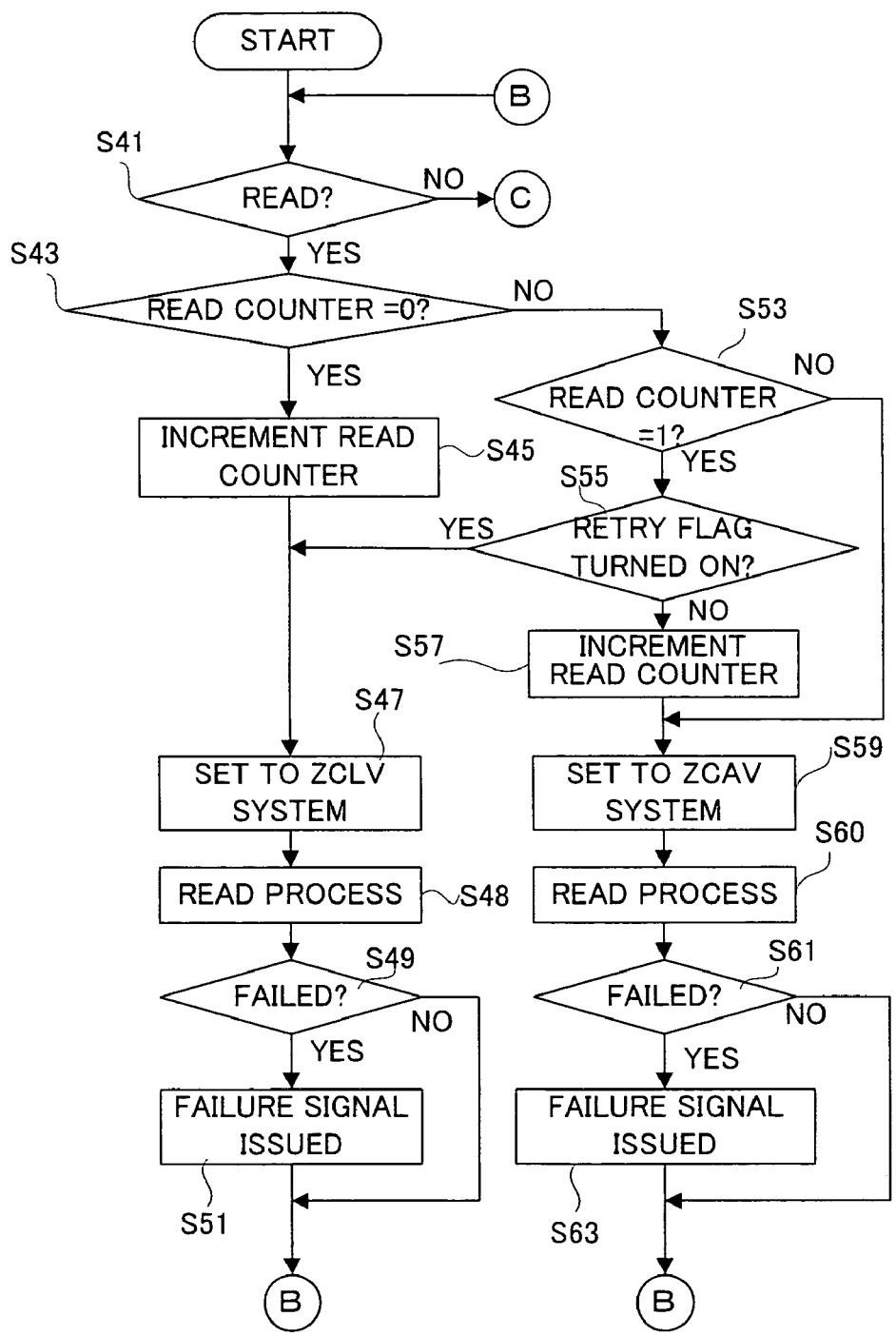
FIG. 5 is a flowchart showing one example of the operation of the FIG. 1 embodiment.

The DSP 28 of the disk apparatus 10 determines that the read command is issued in the step S41 in FIG. 5, and determines whether or not the read counter is "0" in the step S43. Currently, the read counter is "1" so that NO is determined, and the process advances to a step S53. In the step S53, it is determined whether or not the read counter is "1". YES is determined in the step S53, and it is determined whether or not the retry flag is the on-state in a step S55. Currently, the retry flag is the on-state so that YES is determined. The magnetooptical disk 100 is rotated by the ZCLV system in the step 47, and the read of retry is performed in the step S48.

In the step S49 in FIG. 5, in a case of determining that the read is succeeded, the CPU 50 of the host determines that the read is not failed in the step S5 in FIG. 4, and renders the retry flag an off-state in a step S9. Furthermore, in a step S11, a write command is issued to the DSP 28 of the disk apparatus 10.

Figure 6:
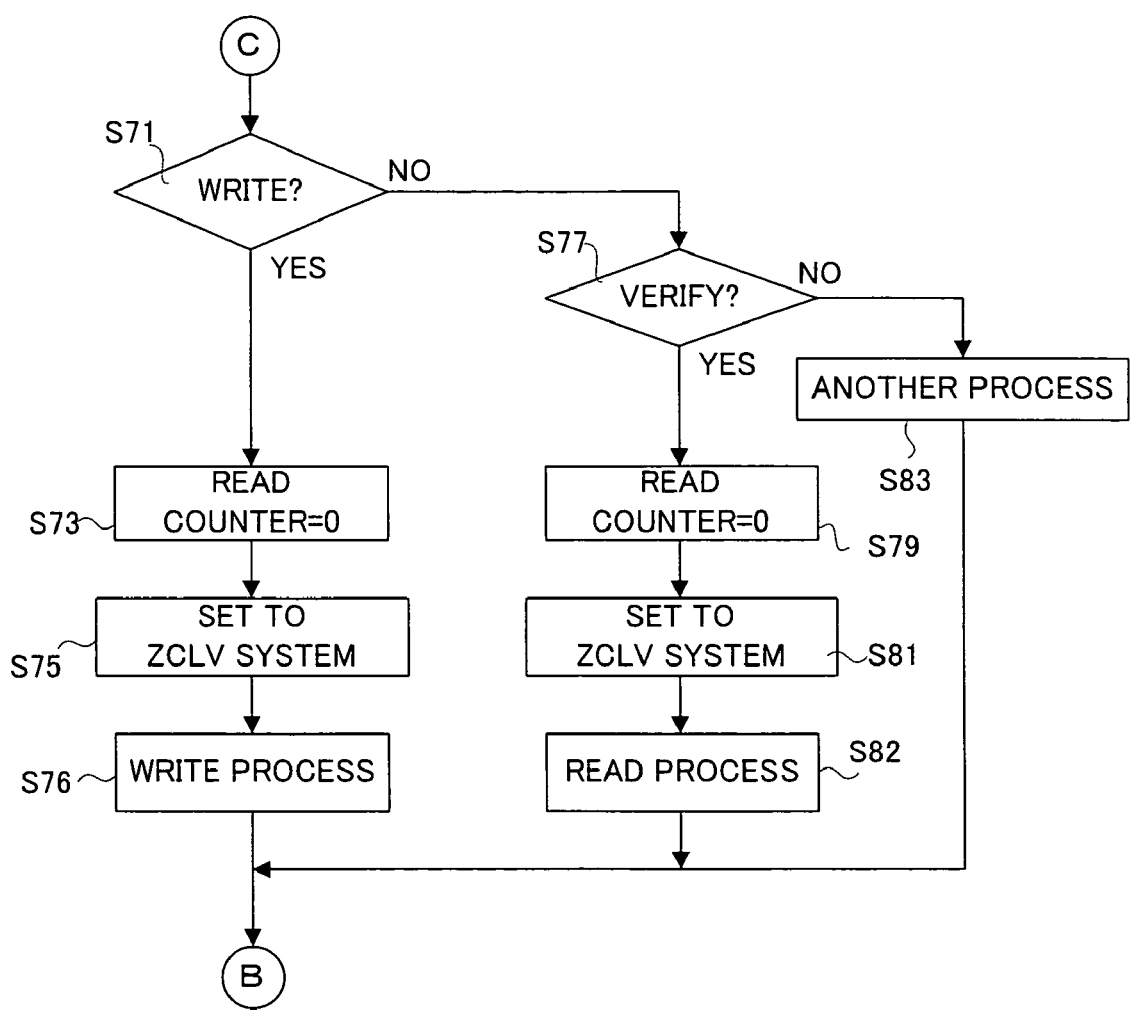
FIG. 6 is a flowchart showing one example of the operation of the FIG. 1 embodiment.

As a consequence, the DSP 28 determines that the write command is issued in a step S71 in FIG. 6, and clears the read counter to "0" in a step S73. In addition, in a step S75, the magnetooptical disk 100 is rotated by the ZCLV system, and a write process is performed in a step S76. In the write process, firstly, the intended address is accessed. Then, the write power value of the laser beam is set. It is noted that the write power value by the ZCLV system is corrected corresponding to the temperature of the magnetooptical disk 100, and is always rendered optimum. Upon completion of the write process, the process returns to the step S41 in FIG. 5.

At this time, the modified read is performed by the ZCLV system, and the write is also performed by the ZCLV system so that even when the process is switched from the read (reproducing) to the write (recording), the rotating speed of the magnetooptical disk 100 is not changed, which makes it possible to smoothly perform the modified read and the read without taking a long time.

Upon completion of the write in the step S76 in FIG. 6, the CPU 50 of the host issues a verify command to the DSP 28 of the disk apparatus 10 in a step S13 in FIG. 4.

As a result, the DSP 28 determines that the verify command is issued in a step S77 in FIG. 6, and clears the read counter to "0" in a step S79. Furthermore, the magnetooptical disk 100 is rotated by the ZCLV system in a step S81, and the read is performed in a step S82.

At this time, the modified read, the writing, and the verifying, that is, all the processes regarding the recording, are performed by the ZCLV system so that it is not needed to change the rotating speed of the magnetooptical disk 100, thus, possible to smoothly perform the process of recording without taking a long time.

It is noted that the disk apparatus 10 performs the write (recording) by each 128 kilo bytes. Therefore, in a case that data intended to record is equal to or more than 128 kilo bytes, the CPU 50 of the host determines that the recording is not ended in a step S15 in FIG. 4, and further repeats the processes after the step S3. In this manner, when it is determined that the recording of all the data to be recorded is completed the step 15, the process returns to the step S1.

Incidentally, if an operation of reproducing is performed to the host, the CPU 50 of the host determines that it is the process of reproducing in a step S17 in FIG. 4, and issues the read command to the DSP 28 of the disk apparatus 10 in a step S19. It is noted that the disk apparatus 10 performs the read (reproducing) by each 128 kilo bytes. Therefore, in a case that the data to be reproduced is equal to or more than 128 kilo bytes, the read command is issued in such a manner as to be divided by each 128 kilo bytes. That is, processes from the step S19 to a step S27 described later are repeatedly executed by each 128 kilo bytes.

If the read command is issued in the step S19, the DSP 28 determines that the read command is issued in the step S41 in FIG. 5, and determines whether or not the read counter is "0" in the step S43. If this is the first read, YES is determined, and the read counter is incremented by only one to "1" in the step S45. In addition, the magnetooptical disk 100 is rotated by the ZCLV system in the step S47, and the read is performed in the step S48. The reason why the first read is performed by the ZCLV system is that as described above, the first read may include the modified read performed before the recording.

Next, it is determined whether or not the read is failed in the step S49, and in a case of determining that the read is failed, the failure signal that indicates that the read is failed is issued to the host in the step S51.

Upon receipt of the failure signal from the disk apparatus 10, the host determines that the read is failed in the step S21 in FIG. 4, and renders the retry flag the on-state in the step S23. In addition, the process returns to the step S19 so as to issue the read command once again.

The DSP 28 of the disk apparatus 10 determines that the read command is issued in the step S41 in FIG. 5, and determines whether or not the read counter is "0" in the step S43. Currently, the read counter is "1" so that NO is determined, and the process advances to the step S53. In the step S53, it is determined whether or not the read counter is "1". YES is determined in the step S53, and in the step S55, it is determined whether or not the retry flag is the on-state. Currently, the retry flag is the on-state so that YES is determined, and the magnetooptical disk 100 is rotated by the ZCLV system in the step S47. Furthermore, the read of the retry is performed in the step S48.

On the other hand, in a case of not determining that the process is failed in the step S49, the process returns to the step S41. In addition, in the host, the CPU 50 determines that the read is not failed in the step S21 in FIG. 4, and renders the retry flag the off-state in the step S25. In the step S27, it is determined whether or not all the data to be reproduced are reproduced. If it is determined that the reproducing is ended, the process returns to the step S1. On the other hand, if it is determined that the reproducing is not ended, the read command is issued to the DSP 28 of the disk apparatus 10 in the step S19.

Then, the DSP 28 determines that the read command is issued in the step S41 in FIG. 5, and determines whether or not the read counter is "0" in the step S43. The read counter is "1" so that NO is determined, and the process advances to the step S53. In the step S53, it is determined whether or not the read counter is "1". The read counter is "1" so that YES is determined, and in the step S55, it is determined whether or not the retry flag is the on-state. Currently, the retry flag is the off-state so that the process advances to a step S57, and increments the read counter by only one to "2". In addition, in a step S59, the magnetooptical disk 100 is rotated by the ZCAV system, and the read process is performed in a step S60. In the read by the ZCAV system, first, the intended address is accessed, and each parameter value such as the cut-off frequency of the RF low-pass filter, the MO signal header phase adjusting timing, and etc., is set. Next, the read power value of the laser beam is set. Furthermore, the read is executed. A phase adjustment of the data and the PLL (Phase Locked Loop) clock is performed during the read. In the read performed in the step S60, the magnetooptical disk 100 is rotated by the ZCAV system so that the magnetooptical disk 100 is rotated at high speed irrespective of a location of the zone 100a in which the sector 100b to be read out is included.

In a step S61, it is determined whether or not the read in the step S60 is failed. In a case of determining that the read is failed, the failure signal is issued to the CPU 50 of the host in a step S63.

As a consequence, the CPU 50 of the host determines that the read is failed in the step S21 in FIG. 4, renders the retry flag the on-state in the step S23, and returns to the step S19 so as to issue the read command for the retry to the DSP 28 of the disk apparatus 10.

In the step S61 in FIG. 6, if it is determined that the read in the step S60 is not failed, the CPU 50 of the host determines that the read is not failed in the step S21 in FIG. 4. In addition, in the step S25, the retry flag is rendered the off-state.

Furthermore, in the step S27, it is determined whether or not all the data to be reproduced are read. In a case of determining that it is not completed to read all the data to be reproduced, the process advances to the step S19 so as to issue the read command for reading the remaining data.

Upon receipt of the read command to be issued, the DSP 28 of the disk apparatus 10 determines that the read is requested in the step S41. The read counter is "2" so that NO is determined in the step S43, and NO is determined also in the step S53. Furthermore, the magnetooptical disk 100 is rotated by the ZCAV system in the step S59, and the read is performed in the step S60. The processes after the step S61 are as described above.

As described above, in the disk apparatus 10 of this embodiment, the magnetooptical disk 100 is rotated by the ZCAV system for reproducing at high speed at a time of reproducing. However, regarding the modified read and the verifying performed at a time of recording, the magnetooptical disk 100 is rotated by the ZCLV system similar to at a time of recording so that a time loss in conjunction with the change of the rotating speed is prevented.

Therefore, a reading-out capability of reproducing is not damaged while it is possible to improve a writing capability of recording.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk apparatus that performs an information reproduction from a disk recording medium when a read command is issued, and performs an information recording to said disk recording medium when a write command is issued, comprising:

a setter for setting a rotating system of said disk recording medium to a zone constant linear velocity system when a command to be occurred is said write command;

a counter for counting the number of continued occurrences of said read command; and a switcher for switching the rotating system of said disk recording medium between said zone constant linear velocity system and a zone constant angular velocity system corresponding to a count value of said counter when the command to be occurred is said read command, wherein when said counter value is set to zero or when the counter is set to one and a retry flag is set indicating a previous read failure then the rotating system of said disk recording medium is set to the zone constant linear velocity system, and when said counter is set to two or higher, the rotating system of said disk recording medium is set to the zone constant angular velocity system.

2. A disk apparatus according to claim 1, wherein said switcher switches said zone constant linear velocity system when said count value does not satisfy a threshold value, and selects said zone constant angular velocity system when said count value is equal to or more than said threshold value.

3. A disk apparatus according to claim 1 or 2, wherein said counter counts the number of occurring times of the read commands successful for the information reproduction, and resets the count value when said write command is occurred.

4. A disk apparatus according to claim 3, wherein said information reproduction is performed also when a verify command is issued, and said counter resets the count value also when said verify command is occurred.

5. A disk apparatus, comprising:

a determiner for determining whether or not a variable indicates a default value in response to a read command;

a first mode setter for setting a control mode to control a rotating speed of a disk recording medium to a first mode when a determination result of said determiner is affirmative;

a changer for changing a value of the variable in association with a setting process of said first mode setter;

a second mode setter for setting the control mode to a second mode when the determination result of said determiner is negative;

a first read processor for executing a read process on said disk recording medium after a setting process of said first mode setter or said second mode setter;

a write processor for executing a write process on said disk recording medium in response to a write command;

a third mode setter for setting the control mode to the first mode corresponding to the write process of said write processor;

a second read processor for executing a read process for verification on said disk recording medium in response to a verify command which is issued next to the write command; and a variable setter for setting the variable to the default value in association with the read process of said second read processor, wherein the read command noted by said determiner for a determining process includes a specific read command, and the write command is a command which is issued next to the specific read command.

6. A disk apparatus according to claim 5, wherein the first mode is a ZCLV mode, and the second mode is a ZCAV mode.

7. A disk apparatus according to claim 5, wherein a recording operation is accomplished by the processes in response to the specific read command, the write command and the verify command, and a reproducing operation is accomplished by the process in response to the read command.

* * * * *